United States Patent
Lanni et al.

(10) Patent No.: US 9,896,973 B2
(45) Date of Patent: Feb. 20, 2018

(54) ASSEMBLY TOOL FOR EXHAUST TURBOCHARGERS

(71) Applicant: ABB Turbo Systems AG, Baden (CH)

(72) Inventors: Fabrizio Lanni, Pfaffikon (CH); Matthias Jarusel, Albbruck (DE); Reiner Probst, Noeggenschwiel (DE); Rudolf Roder, Thun (CH); Hans Baumgartner, Munchenbuchsee (CH)

(73) Assignee: ABB Turbo Systems AG, Baden (CH)

( * ) Notice: Subject to any disclaimer, the term of this patent is extended or adjusted under 35 U.S.C. 154(b) by 5 days.

(21) Appl. No.: 14/864,503

(22) Filed: Sep. 24, 2015

(65) Prior Publication Data
US 2016/0010504 A1 Jan. 14, 2016

Related U.S. Application Data

(63) Continuation of application No. PCT/EP2014/055914, filed on Mar. 25, 2014.

(30) Foreign Application Priority Data

Mar. 28, 2013 (EP) ..................................... 13161751

(51) Int. Cl.
*F01D 25/24* (2006.01)
*F01D 25/28* (2006.01)
(Continued)

(52) U.S. Cl.
CPC .............. *F01D 25/28* (2013.01); *F01D 5/02* (2013.01); *F01D 25/24* (2013.01); *F01D 25/285* (2013.01);
(Continued)

(58) Field of Classification Search
CPC . F01D 25/28; F01D 25/24; F01D 5/02; F01D 25/285; F04D 25/024; F04D 17/10;
(Continued)

(56) References Cited

U.S. PATENT DOCUMENTS 2,803,429 A 8/1957 Whitehead
4,157,613 A * 6/1979 Morrow ................. H02K 15/16
29/596
(Continued)

FOREIGN PATENT DOCUMENTS

CN 202370911 U 8/2012
DE 2146995 A1 4/1973
(Continued)

OTHER PUBLICATIONS

European Search Report Application No. 13 16 1751 Completed: Jul. 26, 2013; dated Aug. 13, 2013 8 pages.
(Continued)

*Primary Examiner* — Bayan Salone
(74) *Attorney, Agent, or Firm* — Barnes & Thornburg LLP (57) ABSTRACT

A lifting apparatus for assembly of exhaust turbocharger allows the removal of the rotor block from the housing in a horizontal direction. The lifting apparatus includes a cantilever, which is fastened on a vertical stop, i.e. on an axial end, of the housing, and on which there is arranged a structure which can be moved along the cantilever and which is likewise fastened on a vertical stop, i.e. an axial end of the rotor block.

14 Claims, 8 Drawing Sheets

(51) Int. Cl.
*F01D 5/02* (2006.01)
*F02B 33/40* (2006.01)
*F04D 17/10* (2006.01)
*F02B 37/00* (2006.01)
*F04D 25/02* (2006.01)
*F04D 29/62* (2006.01)
*F16M 1/04* (2006.01)

(52) U.S. Cl.
CPC .............. *F02B 33/40* (2013.01); *F02B 37/00* (2013.01); *F04D 17/10* (2013.01); *F04D 25/024* (2013.01); *F04D 29/624* (2013.01); *F16M 1/04* (2013.01); *F05D 2220/40* (2013.01); *F05D 2230/60* (2013.01); *F05D 2230/70* (2013.01); *F05D 2230/72* (2013.01); *F05D 2240/20* (2013.01); *F05D 2250/41* (2013.01); *Y10T 29/49009* (2015.01); *Y10T 29/49012* (2015.01); *Y10T 29/49318* (2015.01); *Y10T 29/49321* (2015.01); *Y10T 29/53143* (2015.01); *Y10T 29/53961* (2015.01)

(58) Field of Classification Search
CPC ........ F04D 29/624; F02B 33/40; F02B 37/00; F16M 1/04; F05D 2240/20; F05D 2230/60; F05D 2250/41; F05D 2230/72; F05D 2230/70; F05D 2220/40; Y10T 29/49318; Y10T 29/49321; Y10T 29/53961; Y10T 29/49012; Y10T 29/53143; F16C 2237/00; F16C 2226/00; F16C 43/00
USPC ....... 29/281.1, 889.1, 889.21, 596, 598, 732
See application file for complete search history.

(56) References Cited

U.S. PATENT DOCUMENTS

| | | | | |
|---|---|---|---|---|
| 4,451,979 A * | 6/1984 | Schuster | ............... | F01D 25/285 29/281.4 |
| 4,532,689 A * | 8/1985 | Harder | ................. | B23P 19/025 29/252 |
| 4,635,336 A * | 1/1987 | Ades | ..................... | B23P 11/025 29/252 |
| 5,313,696 A | 5/1994 | Dunne et al. | | |
| 6,279,309 B1 * | 8/2001 | Lawlor | ..................... | F02K 7/10 60/39.35 |
| 8,459,926 B2 * | 6/2013 | Hedley | ................ | B60B 29/002 414/429 |
| 8,534,986 B2 * | 9/2013 | Borer | .................... | F04D 29/624 29/281.1 |
| 8,544,579 B2 * | 10/2013 | Kabrick | ............... | B60K 7/0007 180/65.51 |
| 8,677,589 B2 * | 3/2014 | Ziekow | ................ | B23P 19/022 29/281.1 |
| 8,826,520 B1 * | 9/2014 | Spanos | ................ | B23P 19/025 29/596 |
| 2003/0014961 A1 | 1/2003 | Lawlor et al. | | |
| 2009/0288291 A1 * | 11/2009 | Ziekow | ................ | B23P 19/022 29/700 |
| 2011/0052426 A1 | 3/2011 | Borer et al. | | |
| 2011/0247193 A1 * | 10/2011 | Herbold | ................. | F23R 3/002 29/464 |
| 2012/0034059 A1 | 2/2012 | Hedley et al. | | |
| 2013/0266440 A1 * | 10/2013 | Ota | .................... | F04D 29/4206 415/213.1 |
| 2015/0026979 A1 * | 1/2015 | Muller | ................... | B25B 27/06 29/889.1 |

FOREIGN PATENT DOCUMENTS

| | | |
|---|---|---|
| DE | 10215409 A1 | 10/2003 |
| EP | 0460457 A2 | 12/1991 |
| EP | 2610439 A1 * 7/2013 ............ B25B 27/06 |
| JP | 10220399 A | 8/1998 |
| WO | 2012114555 A1 | 8/2012 |

OTHER PUBLICATIONS

International Search Report Application No. PCT/EP2014/055914 Completed: Apr. 16, 2014; dated Apr. 28, 2014 3 pages.
Written Opinion of the International Searching Authority Application No. PCT/EP2014/055914 Completed: Sep. 28, 2015 15 pages.

* cited by examiner

ASSEMBLY TOOL FOR EXHAUST TURBOCHARGERS

FIELD OF THE INVENTION

The invention relates to the field of rotary machines. It relates to an assembly/disassembly tool and to a method for moving a rotor block in a housing along the axis of rotation of the rotor contained in the rotor block.

Assembly/disassembly tools of this kind are used with exhaust turbochargers of pressure-charged internal combustion engines or comparable rotary machines, in which the rotor block can weigh over one hundred kilograms up to several tons.

BACKGROUND OF THE INVENTION

Exhaust turbochargers are used to pressure-charge large internal combustion engines. These drive marine shipping or large emergency generating equipment.

In order to service the exhaust turbocharger at intervals of several thousand working hours, the rotating parts must be removed from the housing. To do this in the case of conventional exhaust turbochargers, the multi-part housings must be removed and then the rotor must be lifted out of the housing in an axial direction by means of a crane. More specifically, the general practice for the disassembly of an exhaust turbocharger is to remove the compressor housing in order to be able to attach a boom of the crane above the center of gravity of the rotor block.

In addition to the rotating parts of the shaft and of the turbine and compressor wheels connected to the shaft, the rotor block of an exhaust turbocharger also comprises the bearing parts, i.e. axial and radial bearings and internal bearing housing parts. This rotor block is also referred to as a cartridge. In the case of servicing, there is the possibility of completely replacing a cartridge of an exhaust turbocharger. This reduces the downtime of the exhaust turbocharger and hence of the internal combustion engine pressure-charged by means of the exhaust turbocharger. The effort required for the removal and reinsertion of the cartridge can be further reduced if the number of housing parts that has to be removed is a small as possible. It would be desirable, for example, not to have to remove the outer compressor housing, which is firmly integrated into the pipe system of the internal combustion engine by means of its large air outlet branch, and the entire turbine housing during the servicing work. Thus, it would only be necessary to remove the inner compressor housing, situated on the inlet side, in order to be able to pull the rotor block through the axial opening thereby exposed out of the compressor housing and the bearing housing and the gas outlet housing situated behind.

Various devices and methods for pulling and/or inserting rotors, rotor blocks or bearing components out of a housing are described in the prior art.

EP2610439A1, for example, discloses an apparatus for disassembling a turbine bearing or a segment thereof in a stationary turbomachine having a housing which can be divided in two. This apparatus comprises means for supporting the rotor to relieve the weight of the bearing parts to be removed. The apparatus furthermore comprises rail-type supports, along which the bearing parts to be removed can be moved.

JP10-220399 discloses an apparatus for disassembling a rotor of a pump, in which extension pieces are mounted on the shaft stubs, which extension pieces are mounted movably on a support and with the aid of which the rotor can be pushed out of the housing to enable it then to be lifted by a crane.

US2011/0052426A1 discloses an apparatus for disassembling a rotor of a large compressor, which comprises a bilateral support for the rotor, wherein extension elements are provided on the rear side of the rotor in order to ensure support while the rotor is being pushed out of the housing. The apparatus furthermore comprises rail elements, along which the rotor to be removed can be moved.

SUMMARY OF THE INVENTION

The object of the present invention consists in providing a tool and a method which enables a rotor block to be removed from a housing surrounding the rotor block along the axis of rotation of the rotor contained in the rotor block.

According to the invention, this is achieved with a lifting apparatus which has a cantilever, which is fastened on a vertical stop, i.e. an axial end, of the housing and on which a structure which can be moved along the cantilever and is likewise secured on a vertical stop, i.e. an axial end of the rotor block, is arranged.

The linear motion of the structure on the cantilever is accomplished by means of linear guidance (rails) and is optionally equipped with ball bearings.

As an option, the structure of the lifting apparatus is arranged on a carriage, wherein the support for the structure is in two parts and comprises a tilting rod and a vertical fastener, thereby allowing the structure to tilt relative to the position of the cantilever.

As an option, a trapezoidal-threaded spindle, which can be moved either by hand or by a battery-operated screwdriver, can be provided as a drive for the movement along the cantilever.

As an option, the height and tilt of the rotor block can be adjusted by means of threaded screws.

The lifting apparatus according to the invention does not have further supports and requires only the installation space of the filter muffler. In particular, the installation space above the housing of the exhaust turbocharger is not used during the removal and reinsertion of the rotor block, thereby ensuring that insulation, pipes etc. are not compromised.

BRIEF DESCRIPTION OF THE DRAWINGS

Embodiments of the lifting apparatus according to the invention are explained below by means of the drawings, in which.

DETAILED DESCRIPTION OF THE INVENTION

Figure 1:
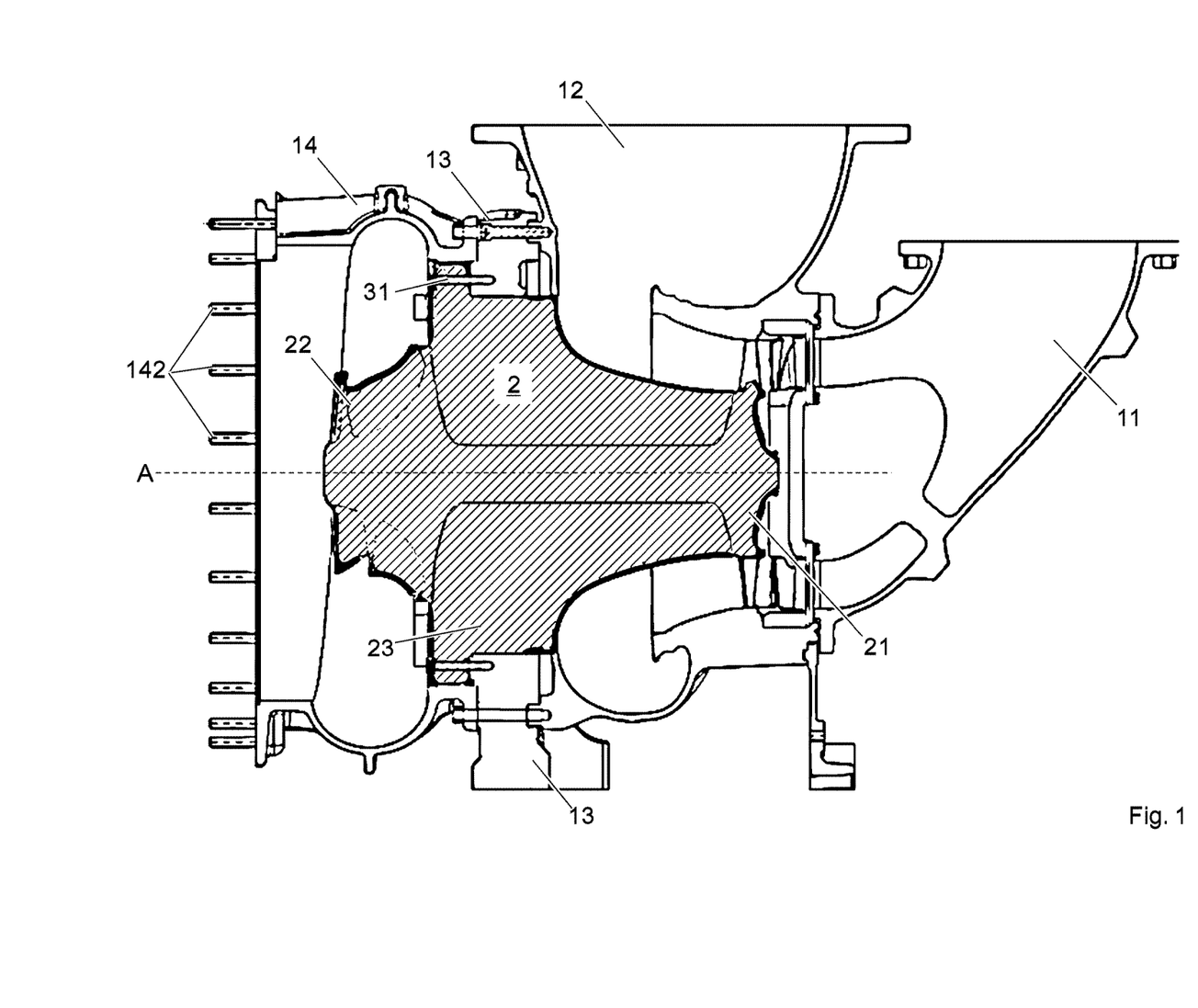
FIG. 1 shows a schematic illustration of a section, taken along the shaft axis (A), through an exhaust turbocharger, wherein the exhaust turbocharger comprises a rotor block which can be pulled out of the housing towards the compressor side in an axial direction.
Figure 2:
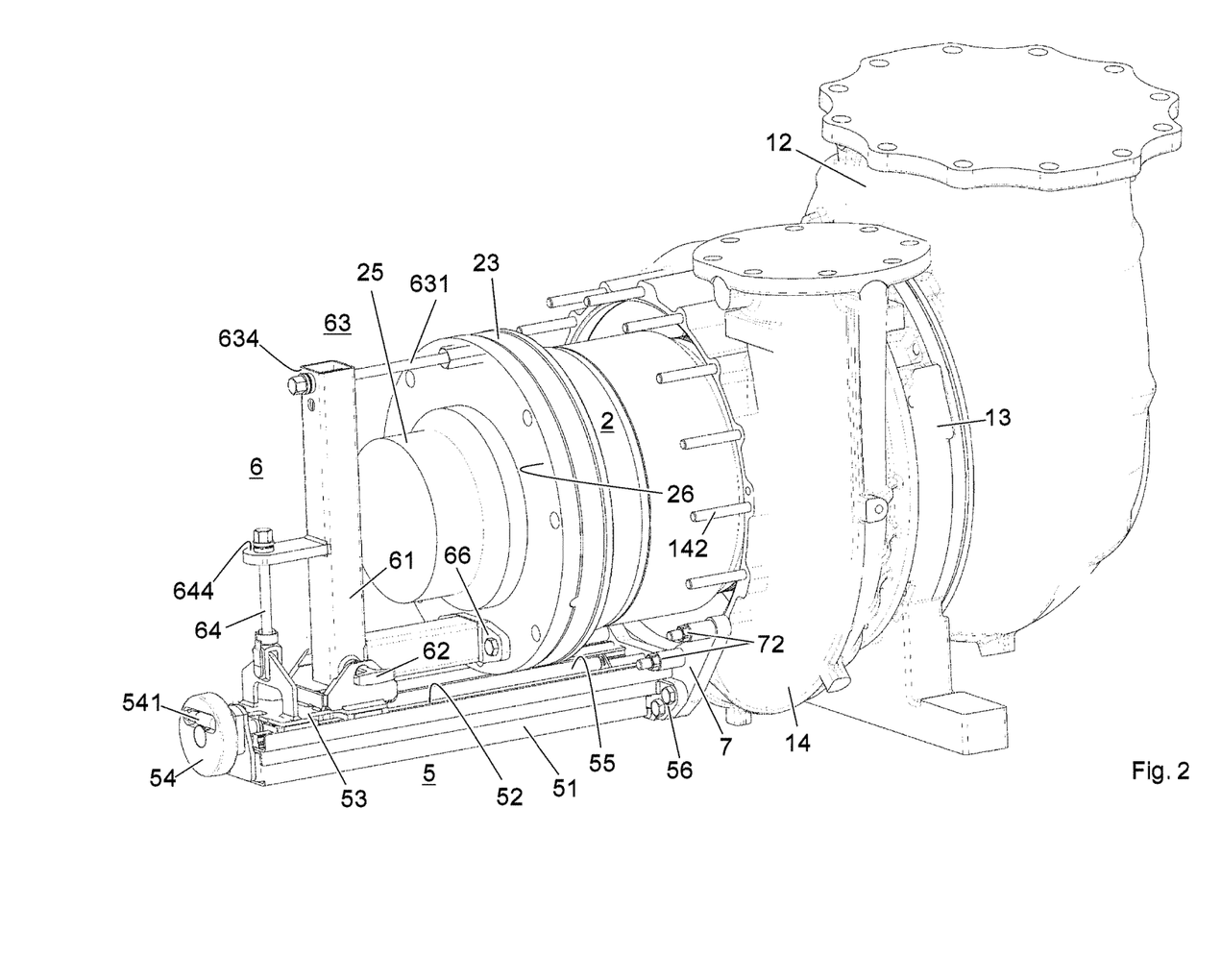
FIG. 2 shows an isometric view of an exhaust turbocharger according to FIG. 1 with an attached lifting apparatus according to the invention in accordance with a first embodiment and a rotor block pulled partway out of the housing.

FIGS. 1 and 2 show an exhaust turbocharger of the kind typically used for pressure-charging large internal combustion engines. It comprises an exhaust turbine with axial inflow and a radial compressor.

The housing of the exhaust turbocharger is composed essentially of five housing parts. The outer bearing housing 13 is arranged axially in the center. In general, the bearing housing stands on a bracket arranged on the internal combustion engine.

The gas outlet housing 12 is fastened on the bearing housing on the turbine side, and the gas inlet housing 11 is in turn fastened on said outlet housing. The gas inlet housing 11 carries the hot exhaust gas flow from the gas inlet to the rotor blades of the turbine wheel 21, wherein the flow duct through the gas inlet housing is redirected from the circular-tube form at the gas inlet into an annular-tube form in the inlet flow region of the turbine blades. The gas outlet housing 12 has a large, spiral collecting chamber and opens into the gas outlet, from where the exhaust gases are directed to the exhaust system or to a downstream second turbine stage, for example.

The outer compressor housing 14 adjoins the outer bearing housing 13 on the compressor side. The outer compressor housing essentially comprises a spiral collecting chamber, which opens into the air outlet. Like the gas inlet and the gas outlet on the turbine side, the air outlet of the compressor is permanently connected to the pipe system of the internal combustion engine and there should generally be no need to undo the respective flange fastenings. The fifth housing part, the inner compressor housing, is not shown in FIGS. 1 and 2. On the one hand, the inner compressor housing is fastened on the outer compressor housing 14 by means of the fastening bolts 142 and, on the other hand, it represents the connection to the air inlet.

The air inlet can be implemented either by an attached filter muffler or by a tubular intake branch. This connection is the only one in the case of servicing which has to be removed at regular intervals. On the one hand, the filter muffler itself has to be serviced at regular intervals and, on the other hand, the opening exposed by the removed inner compressor housing forms the service hatch through which the rotor block of the exhaust turbocharger can be pulled out of the housing.

As the illustration suggests, the center of gravity of the rotor block 2, which comprises not only the actual rotor with the turbine wheel 21, shaft and compressor wheel 22 but also the inner bearing region 23, is situated axially somewhere in the region of the bearing housing. In order to be able to lift the rotor out of the housing opening using a crane acting directly on the rotor block, the outer compressor housing 14 would therefore likewise have to be detached from the outer bearing housing 13. The intention is to eliminate this additional effort using the assembly and disassembly tool according to the invention described below.

Figure 3:
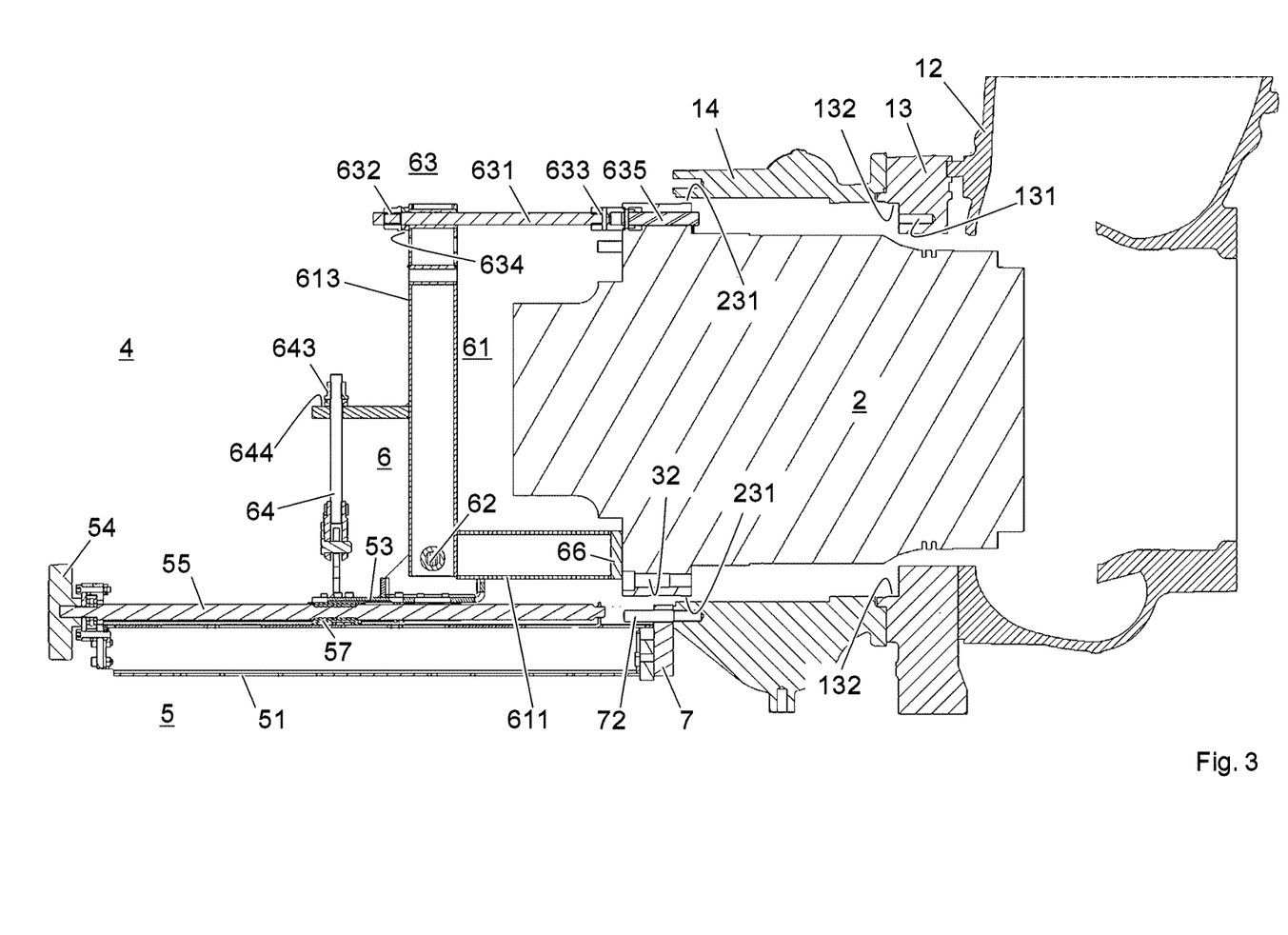
FIG. 3 shows a schematic illustration of a section, taken along the shaft axis, through the exhaust turbocharger together with the lifting apparatus according to FIG. 2.
Figure 4:
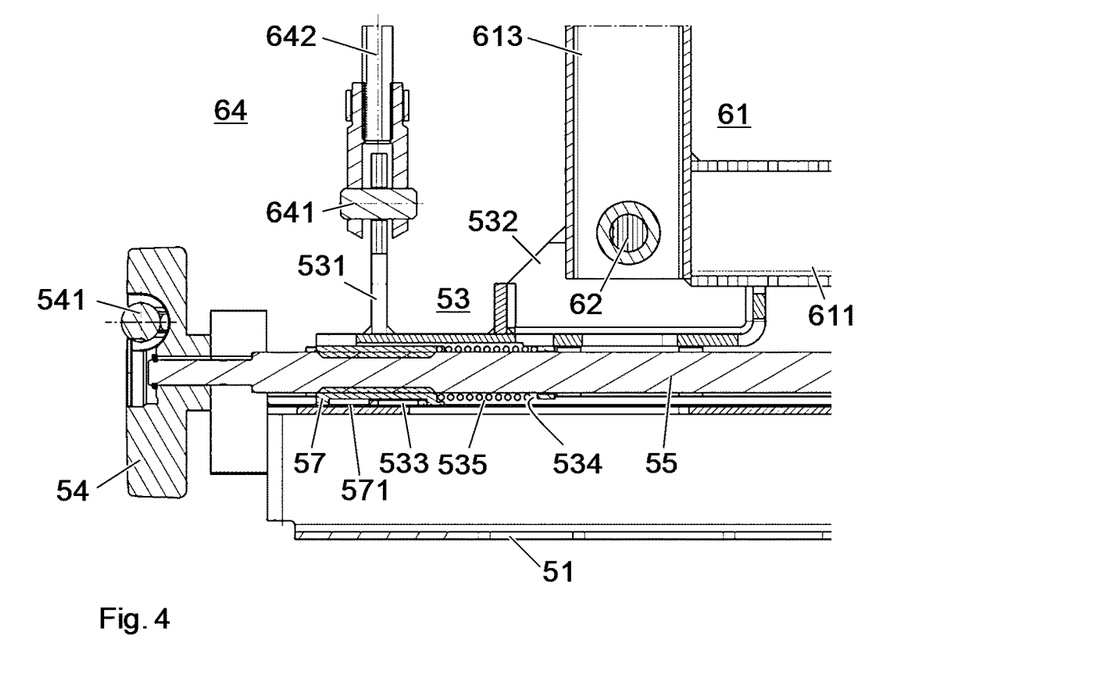
FIG. 4 shows a schematic illustration of an enlarged section through the lifting apparatus according to FIGS. 2 and 3.
Figure 5:
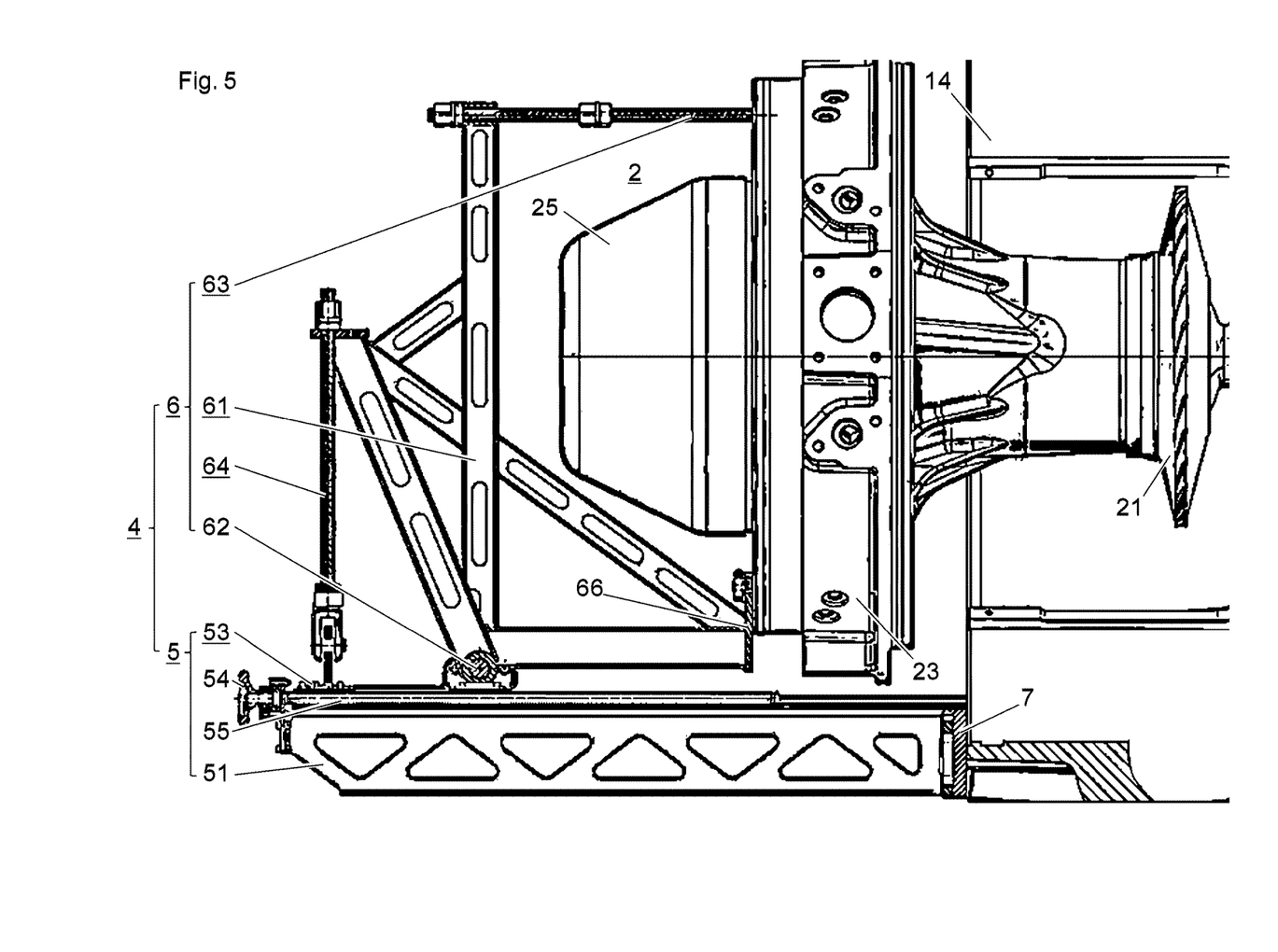
FIG. 5 shows a lateral view of an exhaust turbocharger according to FIG. 1 with an attached lifting apparatus according to the invention in accordance with a second embodiment and a rotor block pulled partway out of the housing.
Figure 6:
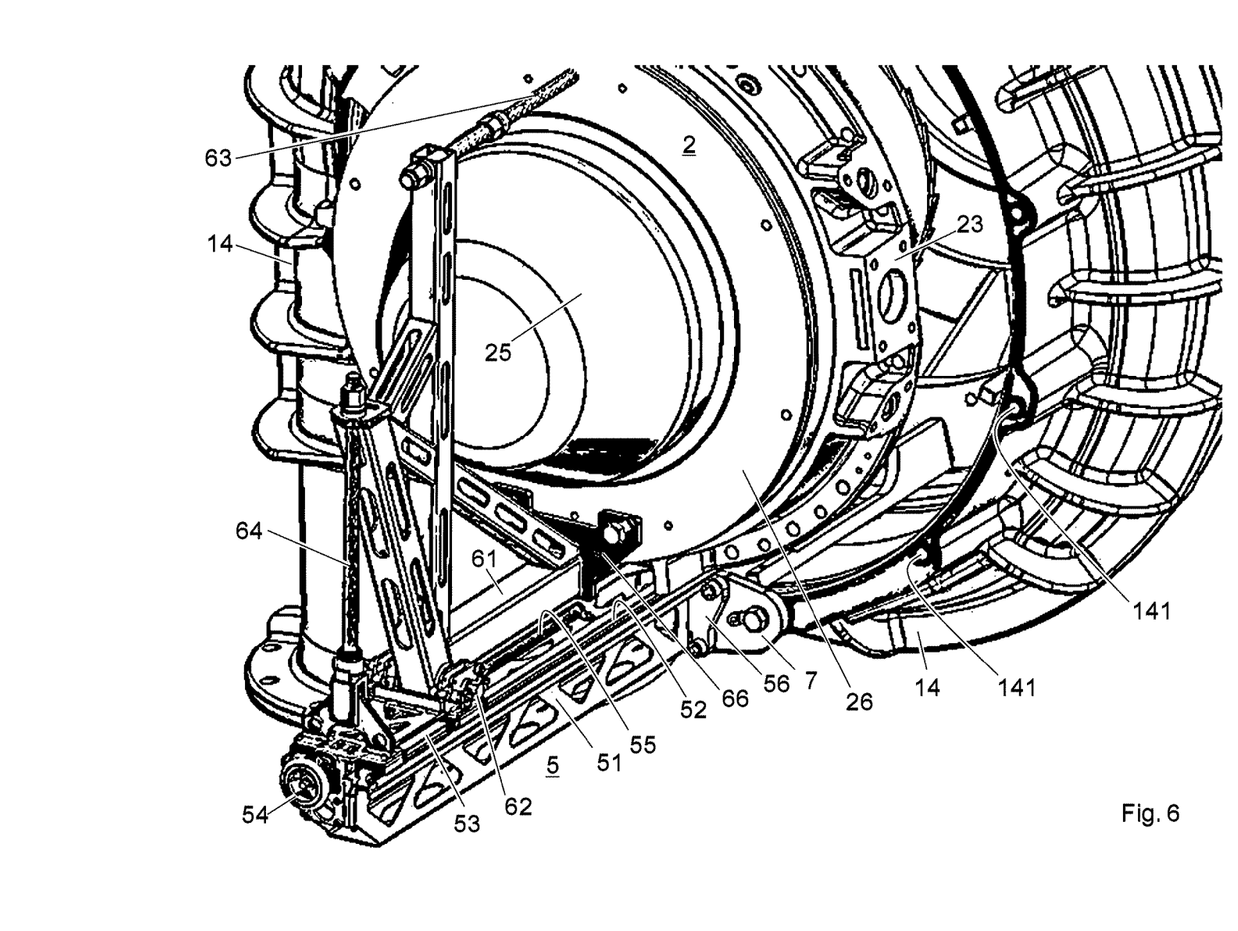
FIG. 6 shows an oblique view of the arrangement according to FIG. 5.

FIG. 2, FIG. 3 and FIG. 4 show a first embodiment of the lifting apparatus 4 according to the invention in use. FIG. 5 and FIG. 6 show a second embodiment of the lifting apparatus 4 according to the invention in use. The individual components of the second embodiment of the lifting apparatus 4 are shown in detail in FIG. 7 and FIG. 8.

In both embodiments, the lifting apparatus 4 comprises two main components, a cantilever 5 and a structure 6 which can be moved on the latter. In general terms, a cantilever (also known in the literature as a cantilever beam or cantilever arm) is a horizontal beam supported at one end which carries a load. The cantilever beam has a single support. The cantilever beam can generally be subjected to shear, bending and torsional stress, and the support fixes all six degrees of freedom (forces and moments). In the present case of the cantilever 5 of the lifting apparatus 4 according to the invention, the horizontal beam is a supporting frame 51, and a mounting plate 56 at one end of the supporting frame serves as a support on the outer compressor housing 14. The compressor housing has fastening holes 141 arranged in a manner distributed along the circumference to receive the fastening bolts 142, which are shown in FIG. 1. The fastening holes are made in a vertical surface of the outer compressor housing, thus forming a vertical stop which is used to fasten the inner compressor housing and, in the case of assembly/disassembly, the cantilever beam 5 of the lifting apparatus 4 according to the invention.

Figure 8:
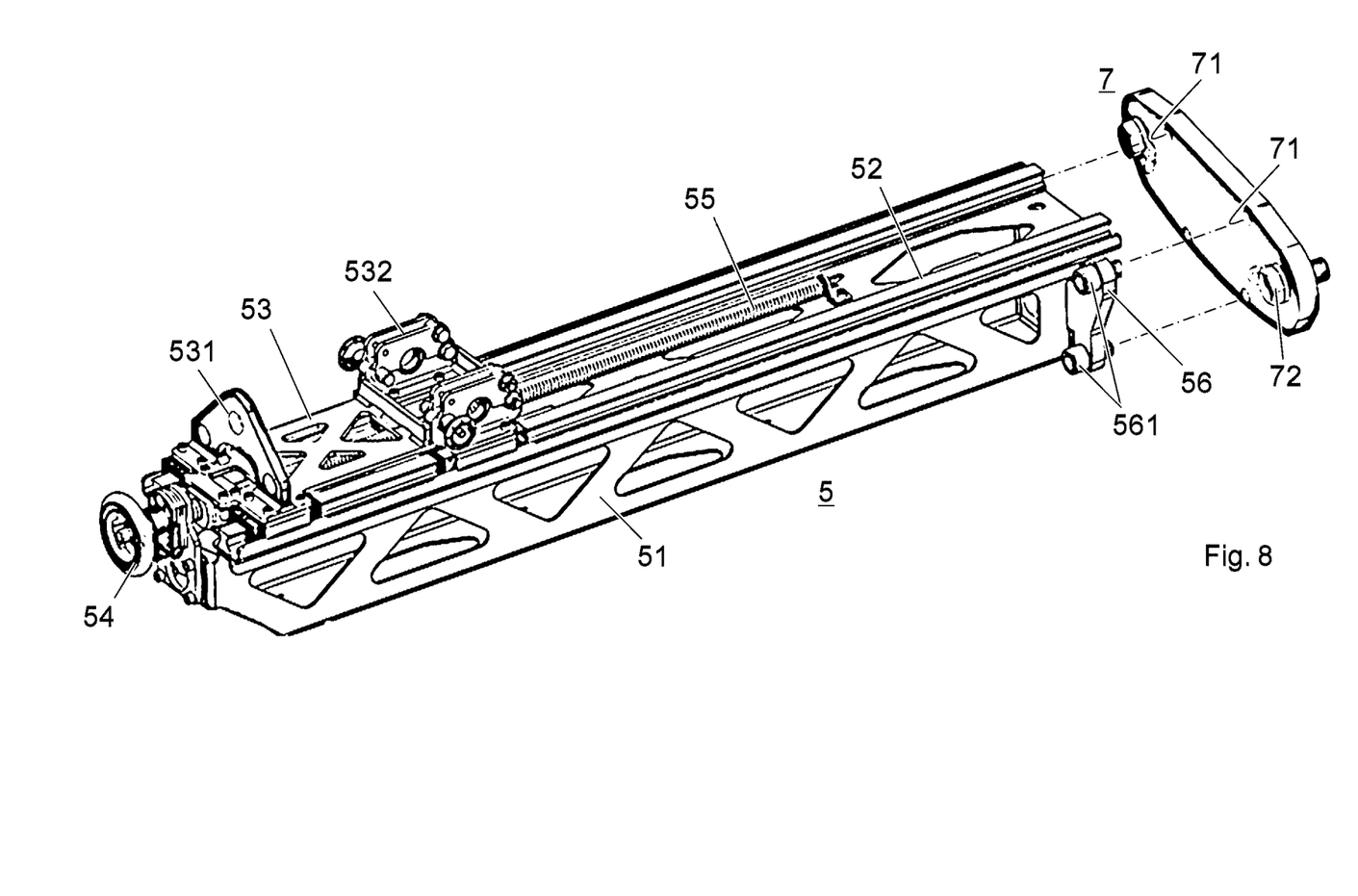
FIG. 8 shows an isometric view of the cantilever of the lifting apparatus and the mounting bracket for fastening the cantilever on the housing of an exhaust turbocharger.

For simplified mounting of the cantilever beam on the outer compressor housing 14 and especially to ensure the transferability of the cantilever beam for exhaust turbochargers of different overall sizes, a mounting bracket 7 can be provided between the mounting plate 56 of the cantilever and the vertical stop of the compressor housing. As an option, however, the cantilever could also be screwed directly onto the outer compressor housing. The mounting bracket 7 is screwed onto the vertical stop of the outer compressor housing using fastening means 72, wherein the abovementioned fastening holes 141 are advantageously used. As an option, holes provided specifically for this purpose could also be used to fasten the mounting bracket 7. Fastening holes 71 for receiving fastening means 561 of the mounting plate 56 of the cantilever beam 5 are made in the mounting bracket 7. As an option, the mounting plate of the cantilever beam could also be connected to the mounting bracket in some other way, e.g. by means of a positive plug-in connection.

Figure 7:
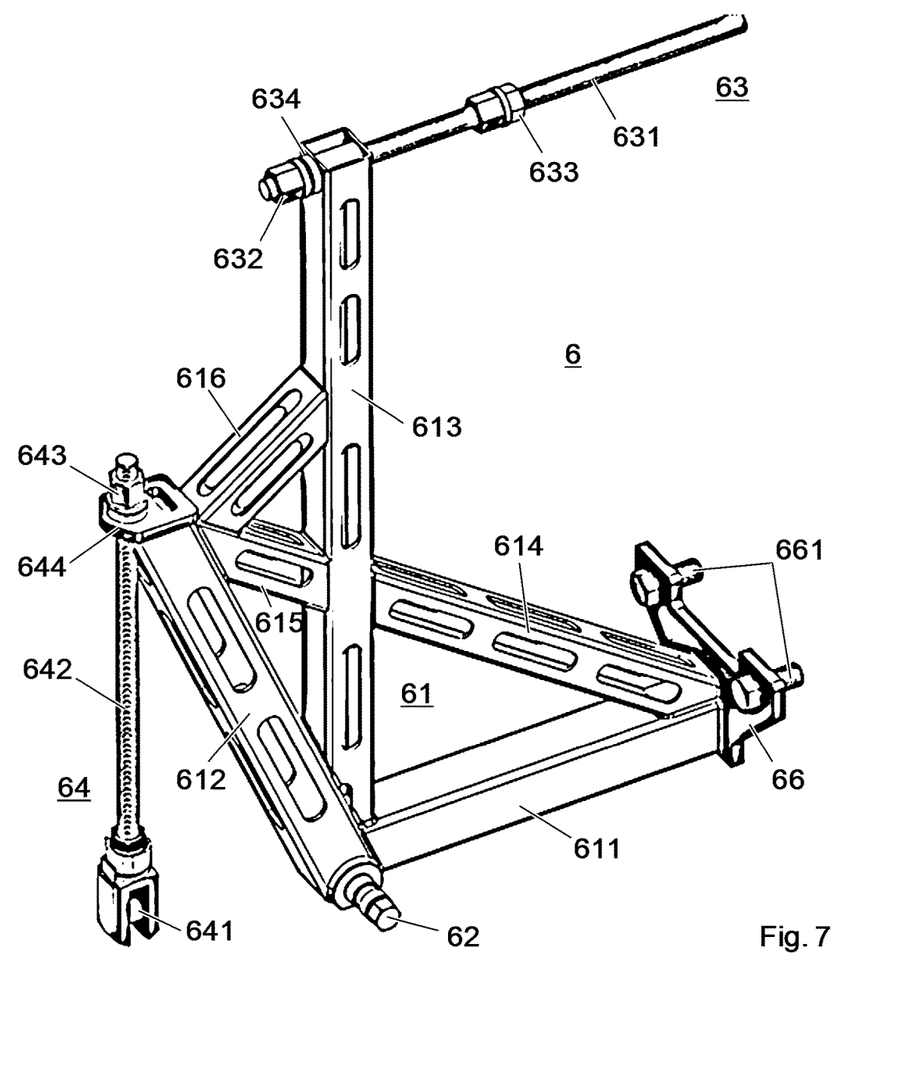
FIG. 7 shows an isometric view of the structure of the lifting apparatus.

The structure 6, the second component of the lifting apparatus, comprises an assembly 61 of sectional bars, which serves to accept and transmit forces to the cantilever. The basic task of the structure of the lifting apparatus according to the invention is to grip the rotor block in order to move it along the extent of the supporting frame of the cantilever and relative to the housing. For this purpose, the structure 6 is mounted on a carriage 53, which in turn can be moved on rails 52 along the supporting frame 51. As an option, the carriage 53 can be guided along the rails 52 of the cantilever by means of a trapezoidal-thread spindle, which is moved either by hand by means of a spindle wheel 54 with a crank 541 or by a battery-operated screwdriver. This allows continuous slow movement of the structure and of the rotor block fastened thereon.

In a simple form, the structure itself could be guided directly along a rail on the cantilever as long as the transmission of forces and moments is ensured. However, this means that there are no possibilities for correction in respect of the height and angular position of the rotor relative to the housing. In order to allow precisely for this point, the structure according to the invention comprises not only the points of engagement on the rotor block and the support on the carriage but also means for tilting the assembly of sectional bars 61 and for aligning the assembly of sectional bars 61 relative to the rotor block 2.

In the simplest, first embodiment, the assembly of sectional bars 61 comprises an L-shaped basic framework formed by the two sectional bars 611 and 613, which is supplemented by the threaded rod 631 of the fastening point 63 to form a C-shaped main support. This main support is fastened at two points, provided for this purpose, on the rotor block, wherein the two fastening points are advantageously spaced apart vertically from one another. In the present case, the two fastening points 63 and 66 are situated at approximately the same radial height above and below the compressor wheel. In the region of the lower fastening point, a mounting plate is arranged on the free end of the sectional bar 611 and can be fastened directly on the vertical stop 26 of the rotor block by means of fastening means 661. In the region of the upper fastening point, the threaded rod 631 is screwed directly into a corresponding hole 32 in the rotor block. On the rotor block, the fastening points can either be arranged on the inner bearing housing 23 itself directly or via a cover plate, which covers any irregularities, e.g. a baffle device in the diffuser region. The openings for the fastening screws 31 by means of which the rotor block is fixed on the outer bearing housing 13 are used to receive the threaded rod 631 of the upper fastening point. The C-shaped basic framework mentioned is provided in the region of intersection of the two sectional bars 611 and 613 with a tilting rod 62, which is rotatably mounted in a fixture 532 on the carriage 53 of the cantilever 5. The inserted tilting rod 62 is secured in the fixture 532 against falling out during the operation of the lifting apparatus by a retaining bolt. The tilting rod allows a tilting movement of the assembly of sectional bars 61 and the rotor block fastened thereon. In order to be able to adjust the extent of the tilting movement to a particular angular position, a vertical fastening 64 of the structure 6 on the carriage is provided at a distance from the tilting rod. The vertical fastening 64 essentially comprises a threaded rod 642 having a nut 643, a horizontal stop 644 having a hole for receiving the threaded rod and a connecting pin 641, which is mounted on the threaded rod, is arranged in a fixture 531 provided for this purpose on the carriage 53 and is likewise secured against falling out during operation. The hole for receiving the threaded rod in the horizontal stop 644 is arranged at a distance from the vertically extending sectional bar 613 of the basic framework. In the first embodiment, the horizontal stop is connected to the basic framework directly and, in the second embodiment, for improved force transmission in the case of relatively heavy rotor blocks, in a fixed manner via a plurality of sectional bars 612, 614, 615 and 616. The horizontal stop 644, which is spaced apart from the vertically extending sectional bar 613 of the basic framework, can be positioned at a greater or lesser distance from the anchoring on the carriage, connecting pin 641, by turning the nut 643, thereby making it possible to achieve a corresponding adjustment of the extent of the tilting movement and a particular angular position of the assembly of sectional bars 62 and of the rotor block fastened thereon relative to the cantilever. According to the second embodiment, the plurality of sectional bars 612, 614, 615 and 616 ensure a high stability of the structure 6, which can be advantageous for instance in the case of relatively large and heavy rotor blocks.

In the region of the upper fastening point, the structure comprises a second possibility of adjusting the angular position of the rotor block fastened on the structure. In addition to the lock nut 633 for screwing the threaded rod 631 into the rotor block 2, the threaded rod 631 has another nut 632 for adjusting the alignment of the structure relative to the rotor block. This nut rests on a vertical stop 634. By rotating the nut 632 on the threaded rod 631, the axial spacing between the vertical stop 634 and the rotor block can be adjusted. When this spacing changes, it has an effect on the angular position of the rotor block relative to the assembly of sectional bars. If the two adjusting options are superimposed, there is the possibility of raising the rotor block in height, supplementing the possibility of adapting the angular position. Tilting the assembly of sectional bars 61 about the axis of the tilting rod 62 leads to a changed angular position of the rotor block fastened on the structure. By changing the spacing between the vertical stop 634 and the rotor block, the modified angular position can be corrected again, thereby resulting in a height adjustment.

As it is pulled out of the housing, the rotor block can thus be adjusted in terms of height and angular position by rotating the two nuts 632 and 643. Owing to the high weight of the rotor, this is a great advantage, especially during installation, since otherwise there would be the risk of the rotor resting at least partially on the housing and damage occurring.

In the case of disassembly, the rotor block is pushed out (pressed out) of the centering seat in the outer bearing housing by means of press-off screws 635. For this purpose, the press-off screws 635, which are provided specifically for this purpose, are screwed through the hole 32 until the seating length in the region of two mutually matched seats 132 (indicated by way of example in FIG. 3) on the outer bearing housing 13 and 231 on the inner bearing housing 23 has been traversed.

To ensure that this axial movement can take place with the lifting apparatus already assembled, a freewheel is provided for this mentioned seating length between a spindle nut 57 mounted on the threaded rod 55 and the carriage 53, as illustrated in detail in FIG. 4. The spindle nut 57 is moved along the threaded rod by rotating the threaded rod. The spindle nut has a groove-shaped freewheel region 571, in which a projection 533 of the carriage is arranged with the ability for free movement between two axial stops. To damp the free movement of the carriage relative to the spindle nut 57 which is possible within the axial stops, a spring 535 is mounted on the threaded rod axially between the spindle nut and an axial stop 534 of the carriage. As soon as the spring 535 of the freewheel has been completely compressed, the threaded rod 55 can be rotated by rotating the spindle wheel, and the movable carriage 53 is taken along.

What is claimed is:

1. A lifting apparatus for moving a rotor block is arranged in an exhaust turbocharger housing, the lifting apparatus comprising:
    a cantilever having a mounting section configured to be fastened on a vertical stop of the exhaust turbocharger housing, wherein the cantilever comprises a supporting frame with rails arranged thereon, and a carriage guided on the rails;
    a structure having a mounting section configured to be fastened on a vertical stop of the rotor block, the structure configured to be mounted on the carriage, the structure and the carriage movable together along the rails and relative to the exhaust turbocharger housing in a direction parallel to an axis of rotation of a rotor contained in the rotor block; and the structure comprises a tilting rod and a vertical fastener configured to permit tilting of the structure relative to a position of the cantilever.

2. The lifting apparatus as claimed in claim 1, wherein the carriage is connected to a spindle nut arranged on a first threaded rod, the spindle nut and the carriage movable together along the first threaded rod by rotating the first threaded rod.

3. The lifting apparatus as claimed in claim 2, wherein a connection with a range of play in a direction of the first threaded rod is provided between the spindle nut and the carriage, allowing the carriage to be moved along the first threaded rod relative to the spindle nut within the range of play, even when the first threaded rod is not being rotated.

4. The lifting apparatus as claimed in claim 1, wherein the structure comprises at least two vertically spaced fastening points connected to the carriage by sectional bars.

5. The lifting apparatus as claimed in claim 4, wherein the at least two vertically spaced fastening points are connected by the sectional bars to the tilting rod and the vertical fastener, wherein the tilting rod and the vertical fastener are each spaced apart horizontally and arranged at different distances from the at least two vertically spaced fastening points, and wherein the structure is fastened by the tilting rod and the vertical fastener on mounting devices of the carriage.

6. The lifting apparatus as claimed in claim 4, wherein at least one of the at least two vertically spaced fastening points is configured to adjust an alignment of the structure relative to the rotor block.

7. The lifting apparatus as claimed in claim 4, wherein the vertical fastener is configured to adjust an alignment of the structure relative to the cantilever.

8. The lifting apparatus as claimed in claim 1, further comprising a mounting bracket configured to fasten the cantilever on the vertical stop of the housing.

9. A method for moving a rotor block, which is arranged in an exhaust turbocharger housing using a lifting apparatus, comprising the following steps:

fastening a mounting section of a cantilever of the lifting apparatus on a vertical stop of the exhaust turbocharger housing;

fastening a mounting section of a structure of the lifting apparatus on the rotor block;

mounting the structure on a carriage of the cantilever;

guiding the carriage on rails of a support frame of the cantilever;

moving the structure and the carriage together along the rails relative to the exhaust turbocharger housing in a direction parallel to an axis of rotation of a rotor contained in the rotor block; and tilting the structure relative to a position of the cantilever.

10. The lifting apparatus as claimed in claim 2, further comprising a spindle wheel configured to rotate the first threaded rod.

11. The lifting apparatus as claimed in claim 7, wherein the vertical fastener includes a second threaded rod and a second nut.

12. The lifting apparatus as claimed in claim 11, wherein the vertical fastener includes a third threaded rod and a third nut, and an angular position of the structure around an axis of the tilting rod is adjustable by the third nut and the third threaded rod.

13. The lifting apparatus as claimed in claim 1, wherein the structure comprises at least two vertically spaced fastening points connected to the rotor block.

14. The method as claimed in claim 9, further comprising fastening the structure to the rotor block at at least two vertically spaced fastening points.

\* \* \* \* \*